(12) United States Patent
Borry et al.

(10) Patent No.: US 10,321,628 B2
(45) Date of Patent: Jun. 18, 2019

(54) DUAL HEADER FOR AN AGRICULTURAL HARVESTER

(71) Applicant: CNH Industrial America LLC, New Holland, PA (US)

(72) Inventors: Stijn Borry, Pittem (BE); Dré W. J. Jongmans, Klundert (NL); Bart M. A. Missotten, Herent (BE); Frederik Tallir, Esen (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/647,886

(22) Filed: Jul. 12, 2017

(65) Prior Publication Data

US 2018/0014462 A1    Jan. 18, 2018

(30) Foreign Application Priority Data

Jul. 12, 2016   (BE) .................................. 2016/5583

(51) Int. Cl.
| | | |
|---|---|---|
| *A01D 41/14* | (2006.01) | |
| *A01D 47/00* | (2006.01) | |
| *A01D 61/00* | (2006.01) | |
| *A01D 41/00* | (2006.01) | |

(52) U.S. Cl.
CPC ........... *A01D 41/142* (2013.01); *A01D 41/14* (2013.01); *A01D 47/00* (2013.01); *A01D 61/004* (2013.01); *A01D 41/00* (2013.01); *A01D 61/00* (2013.01)

(58) Field of Classification Search
CPC .... A01D 41/148; A01D 41/145; A01D 41/14; A01D 61/004; A01D 47/00; A01D 41/00; A01D 61/00
See application file for complete search history.

(56) References Cited

U.S. PATENT DOCUMENTS

| | | | | |
|---|---|---|---|---|
| 4,087,953 | A * | 5/1978 | Wilson | A01F 12/10 56/14.6 |
| 4,367,757 | A | 1/1983 | Claas | |
| 5,518,454 | A * | 5/1996 | Twilley | A01D 41/1272 460/119 |
| 5,957,773 | A * | 9/1999 | Olmsted | A01D 41/1208 460/149 |
| 6,631,585 | B1 | 10/2003 | Williams, Jr. | |
| 7,681,388 | B1 | 3/2010 | Hinds et al. | |

(Continued)

FOREIGN PATENT DOCUMENTS

| | | |
|---|---|---|
| CN | 203353183 U | 12/2013 |
| DE | 3917818 A1 | 12/1990 |
| WO | 9853660 A1 | 12/1998 |

*Primary Examiner* — Arpad Fabian-Kovacs

(74) *Attorney, Agent, or Firm* — Peter K. Zacharias; Patrick M. Sheldrake

(57) ABSTRACT

A header for an agricultural harvester. The header includes a connector adapted to be connected to a feeder of the agricultural harvester. The header further includes a cutter bar and a first lateral crop transporting mechanism to move crop material towards a first opening at the connector. The header further includes a second lateral crop transporting mechanism provided at a distance from the first lateral crop transporting mechanism. The second lateral crop transporting mechanism is provided to move crop material towards a second opening at the connector, the second opening being different from the first opening.

19 Claims, 3 Drawing Sheets

(56) References Cited

U.S. PATENT DOCUMENTS

| | | | |
|---|---|---|---|
| 8,220,236 B1 | 7/2012 | Benner et al. | |
| 9,011,222 B2 * | 4/2015 | Johnson | A01D 41/127 460/1 |
| 9,554,517 B2 * | 1/2017 | Johnson | A01F 12/18 |
| 2006/0046801 A1 * | 3/2006 | Argetsinger | A01D 41/127 460/59 |
| 2007/0033913 A1 * | 2/2007 | Kincaid | A01D 41/12 56/16.5 |
| 2007/0209347 A1 | 9/2007 | Malmros et al. | |
| 2013/0081369 A1 | 4/2013 | Zhu | |
| 2016/0183462 A1 | 6/2016 | Magisson et al. | |

* cited by examiner

DUAL HEADER FOR AN AGRICULTURAL HARVESTER

CROSS REFERENCE TO RELATED APPLICATION

This application claims priority to Belgian Application No. 2016/5583 filed Jul. 12, 2016, the contents of which are incorporated herein by reference.

FIELD OF THE INVENTION

The present invention relates to a header for an agricultural harvester. Particularly, the invention relates to a header for harvesting multiple types of crop materials which are intercropped on a field.

BACKGROUND OF THE INVENTION

Intercropping, meaning that two different types of crop materials are planted alternating and/or mixed on a single field, is becoming more and more popular. Recent studies show that yields can be improved, manuring can be reduced and the necessity of using pesticides can be decreased. For example, U.S. Pat. No. 6,631,585 describes a process for intercropping corn and soy bean plants. Thereby, it is described that the corn and soy beans create a microclimate of humidity as well as a root system and ground cover which effectively resists drought and erosion. It appears therefore that, selecting specific combinations of plants, intercropping can result in one crop type having a positive effect on the other crop type and vice versa.

It is an object of the present invention to provide a header for an agricultural combine which allows to harvest intercropped materials in an improved manner.

SUMMARY OF THE INVENTION

To this end, the invention provides in a header for an agricultural harvester, the header comprising a connector adapted to be connected to a feeder of the agricultural harvester, the header further comprising a cutter bar and a first lateral crop transporting mechanism to move crop material towards a first opening at the connector, characterized in that the header further comprises a second lateral crop transporting mechanism provided at a distance from the first lateral crop transporting mechanism, the second lateral crop transporting mechanism being provided to move crop material towards a second opening at the connector, the second opening being different from the first opening.

The header of the invention has two separate lateral crop transporting mechanisms. Thereby, each lateral crop transporting mechanisms typically extends over substantially the complete width of the header. This allows the header of the invention to transport a first type of crop material, via a first lateral crop transporting mechanism, to a first opening. A second type of crop material can be transported to a second opening via a second lateral crop transporting mechanism. In this manner, the header of the invention allows the first type of crop material and the second type of crop material to be separately collected and transported to separate openings. Furthermore, since each lateral crop transporting mechanism is known to typically extend over the complete width of the header, the first and second crop type can be planted close to each other, thereby maximizing the positive effect of the intercropping, while the header is adapted to receive the first type over the complete width of the header, on the first lateral crop transporting mechanism, and is adapted to receive the second type also over the complete width of the header, on the second lateral crop transporting mechanism. Thus a header is provided that allows to separate the first crop type from the second crop type. This further allows to optimize processing settings, such as threshing settings in the agricultural vehicle for each type of crop material.

Preferably, the header successively comprises, in a direction extending from a front to a back of the header, the cutter bar, the first lateral crop transporting mechanism and the second lateral crop transporting mechanism with a horizontal distance between the first and the second lateral crop transporting mechanism. Further, preferably, the cutter bar and the first lateral crop transporting mechanism are substantially positioned at the same height and wherein the second lateral crop transporting mechanism is positioned preferably at a height that is at least 20 cm, more preferably 30 cm, most preferably at least 40 cm above the first crop transporting mechanism. The front of the header is defined as the leading side when the header is mounted to an agricultural vehicle and is driven in a forward direction. The back of the header is defined as opposite to the front of the header. The direction extending from a front to a back of the header is defined as being parallel to the forward driving direction when the header is mounted to an agricultural vehicle and is driven. Due to the horizontal and/or vertical separation between the first and the second lateral crop transporting mechanisms, keeping the first and second crop type separate during the lateral transportation is facilitated. Furthermore, the horizontal and/or vertical separation can be used as a basis for separating the first crop type from the second crop type during the harvesting. In a preferred configuration with both a horizontal and a vertical separation, a header with two steps is created, showing a lower step and a higher step. The lower step comprises the first lateral crop transporting mechanism while the higher step comprises the second lateral crop transporting mechanism.

Preferably, a crop separating mechanism is provided to separate crop material on the field such that one type of crop material arrives at the first lateral crop transporting mechanism while another type of crop material arrives at the second lateral crop transporting mechanism. Thereby, the separating mechanism can be tailored to two types of crop material wherein a predetermined know physical difference between the crop types is used for separating the crop types, alternatively a row sensitive mechanism is provided ensuring that one row arrives at one of the lateral crop transporting mechanisms while an adjacent row arrives at the second lateral crop transporting mechanism.

Preferably the crop separating mechanism is formed by first and second row pick-up mechanisms alternating along the width of a header, wherein the first row pick-up mechanism is adapted to guide the crop material to the first lateral crop transporting mechanism and wherein the second row pick-up mechanism comprises a lifting belt for lifting the crop material over the first lateral crop transporting mechanism and towards the second lateral crop transporting mechanism. This embodiment particularly provides a row sensitive mechanism wherein every other row is lifted by a lifting belt over the first lateral crop transporting mechanism, so that it arrives at the second lateral crop transporting mechanism. By alternating the first and second row pick-up mechanisms along the width of the header, adjacent rows can be transported to different lateral crop transporting mechanisms of the header. Thereby, the header is constructed, and the agricultural vehicle is driven over the field such that the alternating first and second row pick-up mechanisms correspond to alternating row of crop type on the field.

Alternatively the separating mechanism is formed by a further cutter bar positioned between the first and the second lateral pick-up mechanisms. This further cutter bar is thereby positioned further and/or higher than the first main cutter bar. The further cutter bar will only cut crop material that is higher or falls further than a predetermined height and/or distance. This allows to separate crop types based on the height of the respective crop types. This particular embodiment is optimized for situations wherein a first type crop material is significantly smaller in height than a second type of crop material. Thereby, the further cutter bar cuts the top ends of the larger crop so that their crop elements arrive at the second lateral crop transporting mechanism. The lower crop type will then evidently arrive at the first lateral crop transporting mechanism. This embodiment is row non-sensitive so that there are no restrictions in how to mix or intercrop different types of crop material on the field. Since this embodiment is row non-sensitive, nearly any mixtures of small and large crop types can be harvested using this header. Thereby, preferably the height of the further cutter bar is adjustable so that the separation can be optimized.

The invention further relates to an agricultural combine comprising a header of the invention wherein a feeder is provided comprising a first and a second channel connected to the first and second opening respectively, and wherein the first and second channel are provided to guide the crop materials to a first and a second crop processing mechanism, respectively, provided in a combine body of the combine. This allows to separately transfer the different types of crop material into the body of the agricultural combine where these types of crop material are also kept separate during further processing. Preferably, a first rotor is provided in the first channel of the feeder to transport crop material via the first channel from the header to a combine body for further processing by the first crop processing mechanism, and wherein a second rotor is provided in the second channel of the feeder to transport crop material via the second channel from the header to the combine body for further processing by the second crop processing mechanism.

Preferably, the first and second crop processing mechanisms comprise first and second crop processing actuators 100, 101, respectively, such that the first crop processing mechanism is operable with processing settings that are different from processing settings for operating the second crop processing mechanism. Processing different types of crop material with different types of processing settings appears to be highly advantageous. It allows to optimize the processing and threshing for each crop type.

Preferably, the back end of the combine comprises a first and a second residue spreading system for spreading residue from the first and second crop processing mechanism, respectively. This allows to keep the residue from the first crop type separate from the residue from the second crop type, which could be advantageous for further processing of the residue. For example, different residues typically have different optimal drying times.

Preferably, the combine comprises a first and a second storage tank for storing crop elements from the first and second crop processing mechanisms, respectively. Further preferably, a first and second crop type detecting mechanism is provided before the first and second crop processing mechanism, respectively, and a controller 33 is provided to adapt the first and second crop processing mechanism settings based on the detected crop type, and wherein a valve is provided at an exit of each of the first and second crop processing mechanisms to guide the crop elements to either the first or the second storage tank based on the detected crop type. Providing a valve at the end of the processing mechanism and a crop type detecting mechanism at an entrance, allows to automatically adjust the processing settings to the detected crop type. Furthermore, the crop type can be transported after processing to the correct storage tank for that crop type. This proves to be a significant advantage particularly for row-sensitive embodiments of the header of the invention.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION OF THE DRAWINGS

Headers 2 are devices that are mounted to and across the front of agricultural combines 1 to cut crop plants and direct them toward a crop-receiving opening of the combine for threshing, separating and cleaning inside the combine. Thereby, the header 2 typically has a width that is significantly larger than the width of the crop-receiving opening of the combine. To this end, the header 2 comprises a crop transporting mechanism to transport the crop towards the central crop-receiving opening of the combine.

Headers may use a reciprocating cutter bar or knife that is disposed across the leading edge, i.e. at the front, of the header adjacent to the ground. In operation, the cutter bar severs the plant stalks close to the ground. A reel 21 is also typically provided on these headers to control the tops of the plants. The reel pushes the top of the plant rearward, causing the plant to fall onto the header. The header transports the plant laterally toward a central portion of the header where there is a crop-receiving aperture. Once the crop passes through this aperture it is received in a crop-receiving aperture of the combine, which further conveys the plant back rearward into the combine for further processing.

There are two common types of headers, wherein each type of header applies a different technique to transport the crop laterally. The first of these is called an "auger platform" or "auger header". An auger header comprises an auger in the form of a helical screw that extends laterally across the width of the header. The auger is mounted for rotation at a rear end of the header directly above a floor surface of the header frame. In operation, crop plants fall onto the header directly in front of, or somewhat against the auger. Thereby, the crop plants get caught between the auger and the floor surface so that, due to the rotation of the auger, the crop plants are laterally transported towards the crop-receiving aperture.

The second type of header is called a "draper platform" or "draper header". A draper header has no auger located at the rear of the header. The floor surface of the header is instead formed by two generally flat endless loop conveyor belts mounted to move the crop in the lateral direction to the middle of the header. The conveyor belts are typically located immediately behind the cutter bar and take the place of the floor and the auger of the auger header. A central conveyor is located between these two conveyors to receive the cut crop material and covey it rearward into the crop-receiving aperture.

Figure 1:
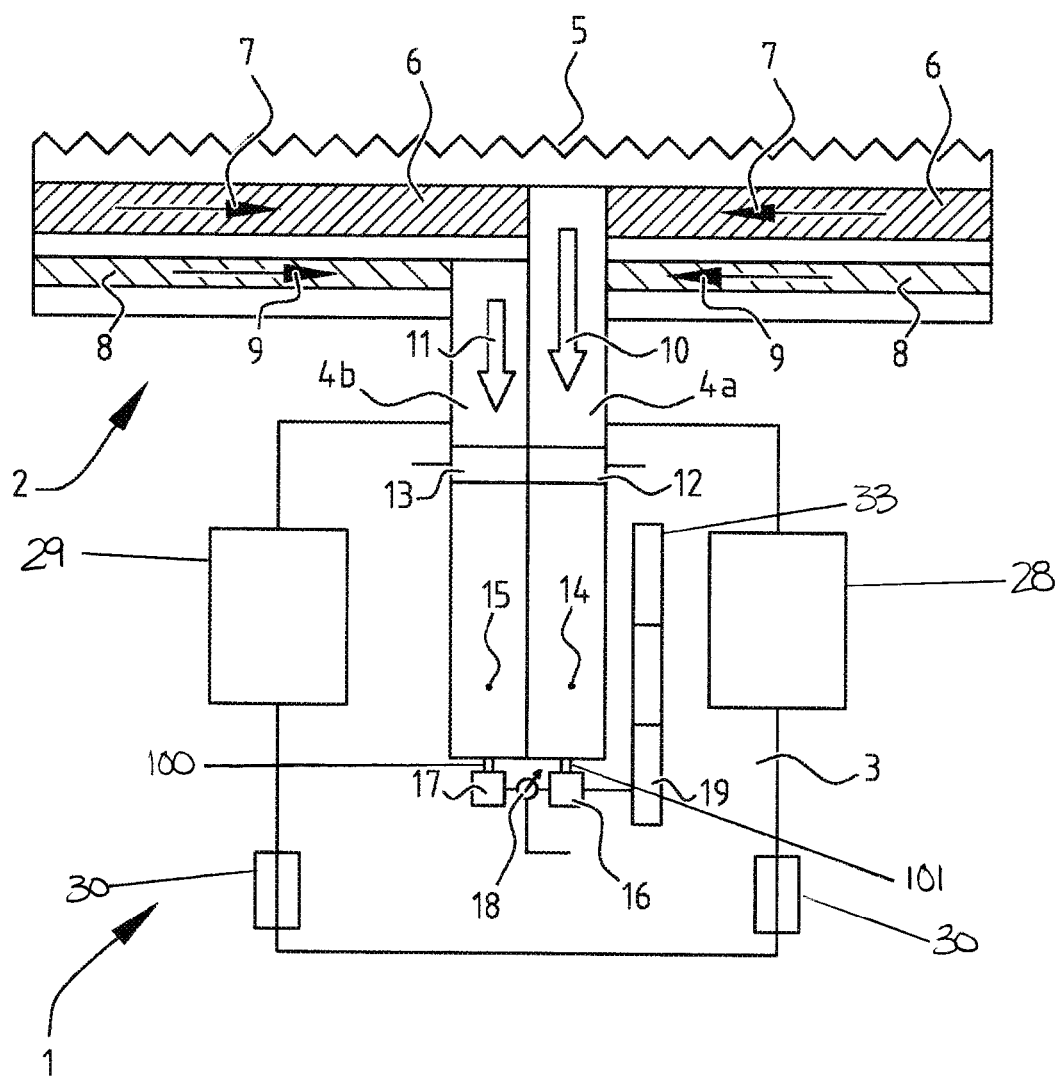
FIG. 1 schematically illustrates a header and an agricultural harvester according to a preferred embodiment of the invention.

FIG. 1 schematically shows an embodiment of the invention. Particularly, FIG. 1 shows an agricultural vehicle 1 carrying a header 2 at its front end. The agricultural vehicle 1 has a body 3 wherein multiple operating elements are provided, as will be further described hereunder. The header 2 comprises a connector for connection with a feeder 4 of the agricultural vehicle behind the header 2. Such connectors are generally known and therefore not described in further detail in this description.

The header 2 comprises a cutting edge 5 extending over substantially the completely width of the header 2 and positioned at a lower front end of the header 2. The cutting edge 5 is adapted to cut the crop material from the field. Behind the cutting edge 5 a first lateral crop transporting mechanism 6 is provided. As described above, lateral crop transporting mechanisms can be formed by augers, as in auger type headers, or can alternatively be formed by a flat endless loop conveyor belt, as in draper headers. In FIG. 1, a draper type header is shown.

The first lateral crop transporting mechanism 6, whether it is formed as an auger or it is formed as a belt conveyor, is adapted to transport crop material which is cut by the cutter bar 5 towards a central part of the header 2. In FIG. 1, this is illustrated by arrows 7. The header 2 further comprises a second lateral crop transporting mechanism 8. The second lateral crop transporting mechanism 8, whether it is formed as an auger or it is formed as a belt conveyor, is also adapted to transport crop material which is cut by the cutter bar 5 towards a central part of the header 2. In FIG. 1, this is illustrated by arrows 9. Preferably, the operation of the first and second lateral crop transporting mechanism 6, 8 is independent from each other. Furthermore, the type of lateral crop transporting mechanism can be the same for the first 6 and the second 8, or can be different. Preferably, the first and the second lateral crop transporting mechanisms operate based on the same operating type. This facilitates the driving mechanisms that are provided to drive the lateral crop transporting mechanism.

The first lateral crop transporting mechanism 6 and second lateral crop transporting mechanism 8 are arranged at a distance from each other. This creates a gap between the first and the second lateral crop transporting mechanism 6, 8. Preferably, a horizontal distance and/or a vertical distance, more preferably both, is provided between the first and the second lateral crop transporting mechanisms 6 and 8. As will be described hereunder, a crop separating mechanism is provided so that a first type of crop material at least largely arrives at the first lateral crop transporting mechanism 6. At the same time, a second type of crop material at least largely arrives at the second lateral crop transporting mechanism. Due to the gap between the first 6 and second 8 lateral crop transporting mechanisms, the first type and the second type of crop material are kept separate during lateral transportation thereof.

The feeder 4 is provided with a first feeder channel 4a and a second feeder channel 4b. The connector connecting the header to the feeder comprises two corresponding openings, wherein a first opening corresponds to the first feeder channel 4a while a second opening corresponds to a second feeder channel 4b. This allows the first type of crop material which is laterally transported 7 by the first lateral crop transporting mechanism 6 to be moved towards the first opening, so that it can enter the first feeder channel 4a. Via de first feeder channel 4a, the first type of crop material is transmitted to the body 3 of the agricultural vehicle 1, as is illustrated with arrow 10. The second type of crop material is laterally transported 9 by the second lateral crop transporting mechanism 8 to arrive at a second opening where it can enter the second feeder channel 4b. Thereby, also the second type of crop material is transmitted to the body 3 of the agricultural vehicle 1, as is illustrated in FIG. 1 with arrow 11. Since the feeder comprises two channels, the two types of crop material can be kept separate during transmitting toward the body 3 of the agricultural vehicle.

In the body 3 of the agricultural vehicle, the threshing process is also preferably separate. This is illustrated in FIG. 1 with the first threshing rotor 14 and the second threshing rotor 15. These first and second threshing rotors 14, 15 are fed by the feeding channels 4a and 4b, respectively. To optimize the feeding, each feeder channel 4a, 4b is preferably actuated by a separate feeder motor. Therefore, FIG. 1 shows a first feeder motor 12 adapted to actuate the elements in the first feeder channel 4a to optimize the crop material stream 10 through the first feeder channel 4a. A second feeder motor 13 is provided to actuate the feeder elements in the second feeder channel 4b to optimize the second stream 11 of crop material through the second feeder channel 4b.

Also the first and second threshing rotors 14 and 15 are driven by corresponding first and second threshing drives 16, 17. The advantage of driving the rotors 14 and 15 by separate drives 16 and 17 is that the threshing process can be optimized for the type of crop material which is processed by each threshing rotor individually. In some situations, the first type of crop material might require the threshing rotor to rotate rather slow, while the second crop material requires the threshing rotor to rotate rather fast for optimal threshing. Using separate threshing drives 16, 17, allows individually optimize threshing properties for each threshing rotor 14, 15.

In the embodiment of FIG. 1, two separate motors 12, 13 are provided to drive the first and second feeder 4a, 4b, and a gearbox 18 is provided between the first threshing drive 16 and the second threshing drive 17, which are driven by a single power supply 19. The skilled person will understand that individual driving settings can be pursued in both configurations. By providing a gearbox 18 between the first threshing drive 16 and the second threshing drive 17, the first and second threshing drives 16, 17 can be driven by a single power supply 19, while it remains possible to divide the power and/or rotational speed between the first and the second drive 16, 17 via the gearbox 18. Such set-up allows to use different processing settings in one agricultural vehicle 1 for processing different types of crop material.

The first type of crop material and second type of crop material, after threshing, are preferably transported to corresponding storage tanks 28, 29. Based on these principles, a header and an agricultural vehicle are provided to harvest two types of crop material which are intercropped, and wherein the agricultural vehicle and the header are optimized to separate the types of crop material after cutting, and to process each type of crop material with optimal processing settings.

Figure 2:
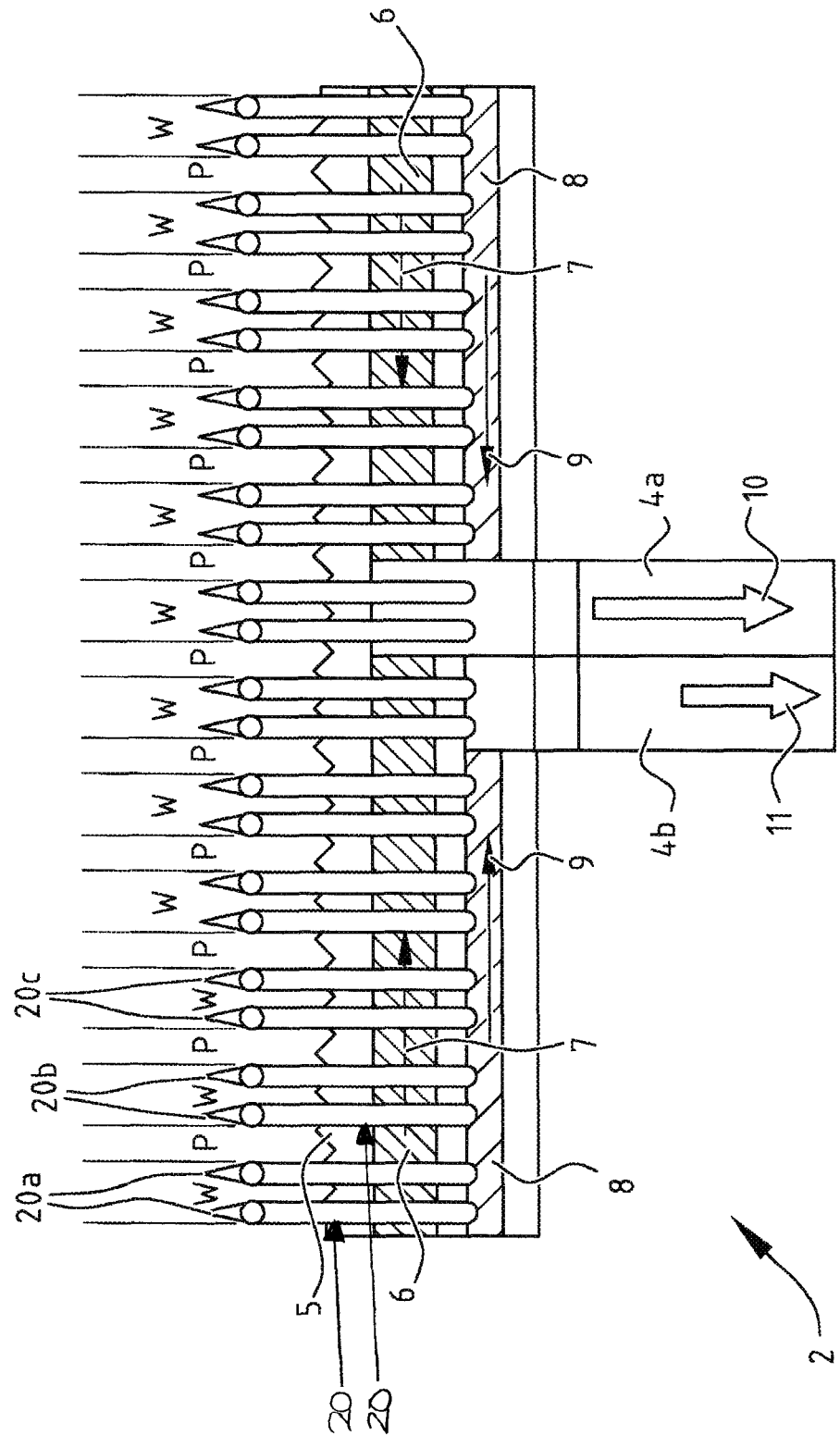
FIG. 2 shows a top view of a header according to a first preferred embodiment of the invention.

FIG. 2 shows a header which is constructed according to a preferred embodiment of the invention. The header of FIG. 2 is formed as a draper type header, meaning that the lateral crop transporting mechanism 6, 8 for transporting first type 7 and second type 9 of crop material towards the center part of the header 2 are formed by endless conveyor belts. Thereby the first type of crop material is transported to a first opening corresponding to a first feeder channel 4a to be transported to the agricultural vehicle as illustrated with arrow 10, and the second type of crop material is transported to a second opening to be fed via a second feeder channel 4b to the body as is illustrated with arrow 11.

The header 2 is provided with a crop separation mechanism. The crop separation mechanism in the embodiment of FIG. 2 is row sensitive. Thus, when intercropping a first type of crop material and a second type of crop material to be harvested with the agricultural vehicle comprising a header as shown in FIG. 2, the first type of crop material and the second type of crop material are positioned in predetermined rows that correspond to the crop separation elements at the header. In FIG. 2, an example is shown where peas p and wheat w are intercropped by alternately providing rows of peas and of wheat, as illustrated in the figure. Due to the alternate placement of the rows, the first and second type crop material can be grown close to each other on the field in a substantially uniform manner so that the different types of crops optimally positively influence each other during growing.

In the header, multiple pairs of fingers 20 are provided extending forwardly from the cutting edge 5. In FIG. 2, fingers 20a form a first pair, fingers 20b form a second pair, fingers 20c form a third pair, which illustrates how the pairs of fingers are positioned along the front end of the header. A predetermined distance is provided between two fingers of a pair 20. Furthermore, a predetermined distance is provided between adjacent pairs. Due to this specific set-up, in operation of such header 2, crop material that arrives between two fingers of a pair will be processed by the pair of fingers, according to the specifications of the pair fingers, while a crop material that arrives between adjacent pairs is not processed by the fingers, and hence, is processed differently. For example, each pair of fingers 20 can be provided with a clamping belt, similar to the fingers used for flax harvesters, to grab and lift the crop elements over the first lateral crop transporting mechanism 6 and onto the second lateral crop transporting mechanism 8. The crop elements that arrive between adjacent pairs of fingers are then not lifted by the clamping belt, and are not lifted over the first lateral crop transporting mechanism so that these crop elements arrive at the first lateral crop transporting mechanism 6. In this manner, a separation mechanism for separating first and second crop type is provided by the fingers 20, which separation mechanism is row sensitive.

Figure 3:
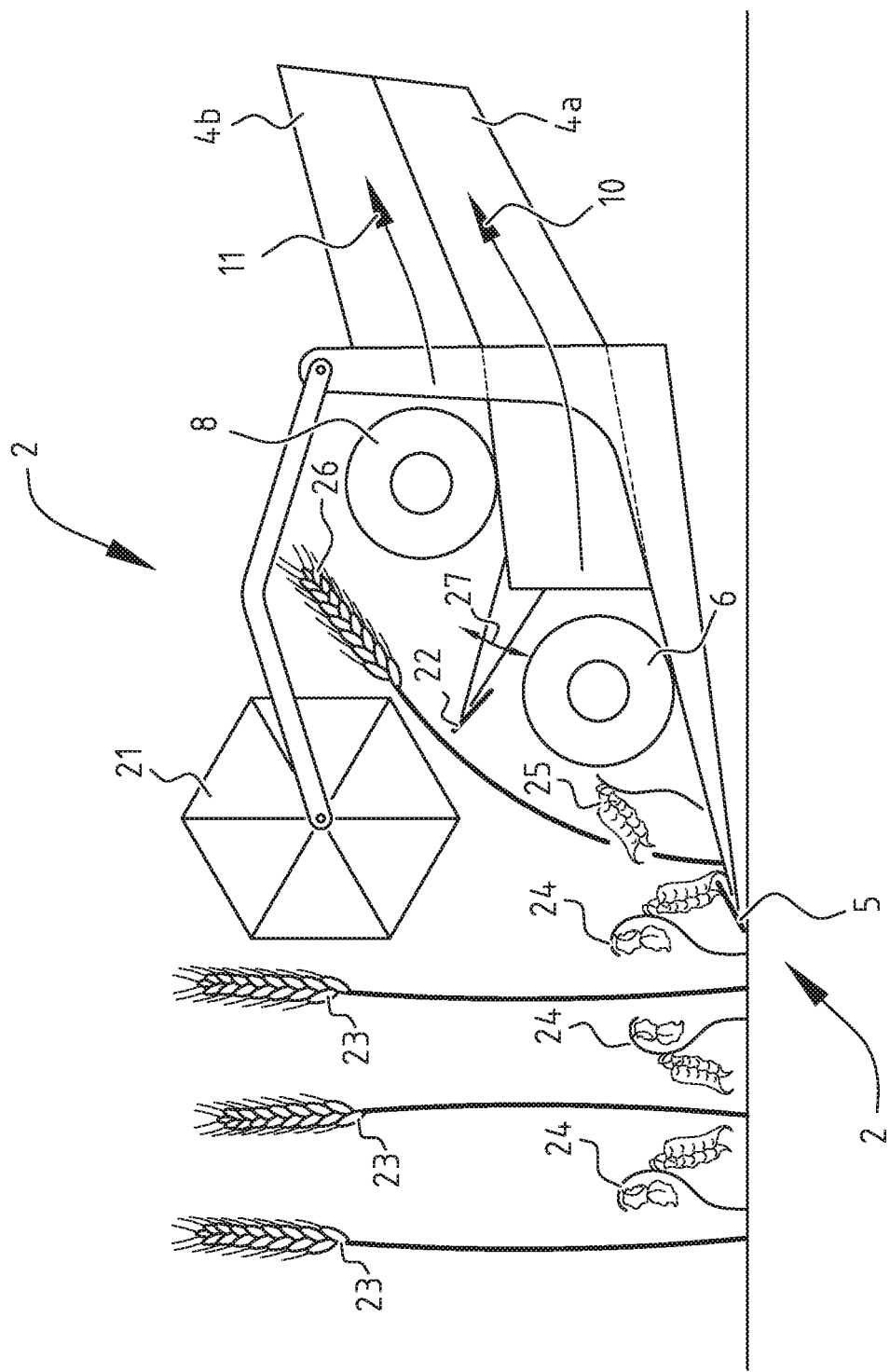
FIG. 3 shows a cross-section of a header according to a second preferred embodiment of the invention.

FIG. 3 shows an alternative embodiment of the invention. FIG. 3 shows a cross-section of a header 2 which is connected to a feeder 4. The header of FIG. 3 is an auger type header, wherein the first lateral crop transporting mechanism 6 is formed as a first auger, while the second lateral crop transporting mechanism 8 is formed as a second auger. As shown in FIG. 3, the second lateral crop transporting mechanism is formed higher than the first lateral crop transporting mechanism 6, and is placed at a horizontal distance.

The embodiment of FIG. 3 further differs from the embodiment of FIG. 2 by the separation mechanism. The separation mechanism of the header of FIG. 3 is based on a difference in height of the first and second crop material. The header of FIG. 3 is optimized for harvesting a first crop type 23 and a second crop type 24 wherein the first crop type 23 is significantly higher or larger than the second crop type 24. Thereby, the header of FIG. 3 is provided with a further cutting edge 22 positioned between the first and the second lateral crop transporting mechanisms 6, 8. The result of this further cutting edge 22 is illustrated in FIG. 3.

FIG. 3 shows how a small crop element 25 is cut by the leading cutting edge 5, and directly falls onto the first lateral crop transporting mechanism 6. A high crop element 26 is also cut by the leading cutting edge 5, and due to its height, falls with its stem onto the further cutting edge 22 so that the top part of the crop material 26 arrives at the second lateral crop transporting mechanism 8. By providing a reel 21, frequently used on headers 2 to assist the falling of the crop material in the right direction of the cutting, correct separation can be further improved. Furthermore, the height of the further cutting edge 22 is preferably adjustable, as is illustrated in FIG. 3 with arrow 27.

The embodiment of FIG. 3 is non-row sensitive, so that first and second type of crop 24, 23, can be randomly intercropped and positioned on the field. The embodiment of FIG. 3 is however only applicable when the height of the first and second crop type have a predetermined minimum difference. The embodiment of FIG. 2 allows separation of first and second crop type irrespective of their heights, however this embodiment is row sensitive.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

The invention claimed is:

1. A header for an agricultural harvester, the header comprising:
   a connector adapted to be connected to a feeder of the agricultural harvester;
   a cutter bar;
   a first lateral crop transporting mechanism having a first longitudinal axis configured to move crop material towards a first opening at the connector; and
   a second lateral crop transporting mechanism having a second longitudinal axis spaced from the first longitudinal axis of the first lateral crop transporting mechanism, the second lateral crop transporting mechanism configured to move crop material towards a second opening at the connector.

2. The header according to claim 1, wherein the header successively comprises, in a direction extending from a front to a back of the header, the cutter bar, the first lateral crop transporting mechanism, and the second lateral crop transporting mechanism, with at least a horizontal distance between the first and the second lateral crop transporting mechanism.

3. The header according to claim 1, wherein the cutter bar and the first lateral crop transporting mechanism are positioned at substantially a same height, and wherein the second lateral crop transporting mechanism is positioned above the first lateral crop transporting mechanism.

4. The header according to claim 3, wherein the second lateral crop transporting mechanism is positioned at a height that is at least 20 cm above the first lateral crop transporting mechanism.

5. The header according to claim 1, further comprising a crop separating mechanism for separating crop material on the field, such that the header is adapted to receive one type of crop material at the first lateral crop transporting mechanism while the header is adapted to receive another type of crop material at the second lateral crop transporting mechanism.

6. The header according to claim 5, wherein the crop separating mechanism comprises a first row pickup mechanism and second row pickup mechanism alternating along the width of the header, wherein the first row pickup mechanism is adapted to guide the crop material to the first lateral crop transporting mechanism and wherein the second row pickup mechanism comprises a lifting belt for lifting the crop material over the first lateral crop transporting mechanism and onto the second lateral crop transporting mechanism.

7. The header according to claim 5, wherein the separating mechanism comprises a cutter bar positioned between the first and second lateral pickup mechanisms.

8. An agricultural combine comprising:
a header comprising:
 a connector adapted to be connected to a feeder of the agricultural harvester;
 a cutter bar;
 a first lateral crop transporting mechanism configured to move crop material towards a first opening at the connector; and
 a second lateral crop transporting mechanism disposed at a distance from the first lateral crop transporting mechanism, the second lateral crop transporting mechanism configured to move crop material towards a second opening at the connector, the second opening being different from the first opening;
a body comprising a first crop processing mechanism and a second crop processing mechanism; and
a feeder comprising a first channel and a second channel connected to the first and the second opening respectively, wherein the first channel and the second channel are provided to guide the crop material to the first crop processing mechanism and the second crop processing mechanism, respectively.

9. The agricultural combine according to claim 1, further comprising:
a first motor operationally connected to a first rotor in the first channel of the feeder to transport crop material via the first channel from the header to the body for further processing by the first crop processing mechanism; and
a second motor operationally connected to a second rotor in the second channel of the feeder to transport crop material via the second channel from the header to the body for further processing by the second crop processing mechanism.

10. The agricultural combine according to claim 8, wherein the first and the second crop processing mechanisms comprise first and second crop processing mechanism actuators, respectively, such that the first crop processing mechanism is operable with processing settings that are different from processing settings for operating the second crop processing mechanism.

11. The agricultural combine according to claim 8, further comprising a first storage tank and a second storage tank for storing crop elements from the first and second crop processing mechanism, respectively.

12. The agricultural combine according to claim 11, further comprising:
a first crop type detecting mechanism and a second crop type detecting mechanism disposed before the first and second crop processing mechanism, respectively;
a controller configured to adapt the first and second crop processing mechanism settings based on a detected crop type; and
a valve dispose at an exit of each of the first and second crop processing mechanism to guide the crop elements to either the first or the second storage tank based on the detected crop type.

13. A header for an agricultural harvester comprising:
a connector for connecting to an agricultural harvester, the connector having a first opening and a second opening spaced above or anterior to the first opening;
a first cutter bar;
a first crop transporting mechanism for moving a first type of crop material towards the first opening of the connector; and
a second crop transporting mechanism configured for moving a second type of crop material towards the second opening.

14. The header according to claim 13, further comprising a second cutter bar spaced above or anterior to the first cutter bar.

15. The header according to claim 13, further comprising a crop separating mechanism extending forwardly of one of the first and second cutter bars.

16. The header according to claim 15, wherein the crop separating mechanism comprises a plurality of finger pairs extending forwardly of the header.

17. The header according to claim 16, wherein each adjacent pair of finger pairs of the plurality of finger pairs is spaced a distance that differs from a distance between each finger of one of the plurality of finger pairs.

18. The header according to claim 15, wherein the crop separating mechanism comprises a first row pickup mechanism and second row pickup mechanism alternating along the width of the header, and wherein the second row pickup mechanism comprises a lifting belt for lifting the crop material.

19. The header according to claim 13, wherein the first crop transporting mechanism is below or anterior to the second crop transporting mechanism.

* * * * *